United States Patent [19]

Nishino

[11] Patent Number: 5,508,569
[45] Date of Patent: Apr. 16, 1996

[54] BATTERY DRIVEN EQUIPMENT HAVING A LOCKING MECHANISM

[75] Inventor: Tooru Nishino, Kawasaki, Japan

[73] Assignee: Fujitsu Limited, Kawasaki, Japan

[21] Appl. No.: 208,377

[22] Filed: Mar. 10, 1994

[30] Foreign Application Priority Data

May 27, 1993 [JP] Japan ................................... 5-124577

[51] Int. Cl.⁶ .................................................... H02J 7/00
[52] U.S. Cl. ................................ 307/150; 320/2; 429/1; 361/171; 361/172
[58] Field of Search ........................... 307/150; 361/728, 361/171, 172; 320/2; 29/730; 429/1, 96, 100

[56] References Cited

U.S. PATENT DOCUMENTS

| | | | |
|---|---|---|---|
| 4,656,850 | 4/1987 | Tabata | 70/276 |
| 5,019,465 | 5/1991 | Herron | 429/97 |
| 5,235,855 | 8/1993 | Patrick et al. | 73/622 |

*Primary Examiner*—William M. Shoop, Jr.
*Assistant Examiner*—Albert Paladini
*Attorney, Agent, or Firm*—Nikaido, Marmelstein, Murray & Oram

[57] ABSTRACT

Disclosed herein is a battery driven equipment including an equipment body, a battery pack detachably mounted in the equipment body, a locking mechanism for releasably locking the battery pack with respect to the equipment body, a device for determining whether or not the battery pack is allowed to be removed from the equipment body, and a device for instructing the locking mechanism to lock or unlock the battery pack according to a result of determination by the determining device.

13 Claims, 9 Drawing Sheets

5,508,569

1

BATTERY DRIVEN EQUIPMENT HAVING A LOCKING MECHANISM

BACKGROUND OF THE INVENTION

1. Field of the Invention

The present invention relates generally to a battery driven equipment such as a portable personal computer to be driven by a battery pack detachably mounted in an equipment body of the equipment, and more particularly to a battery driven equipment having a locking mechanism for releasably locking the battery pack with respect to the equipment body.

2. Description of the Related Art

In a conventional battery driven equipment designed to be operated by power supplied from a battery pack removably mounted in an equipment body of the equipment, there is a problem that when the battery pack is drawn from the equipment body in its operative condition, the equipment body fails to operate because of no supply of power to lose data to be held in the equipment. To cope with this problem, there has been proposed that an internal battery different from the battery pack is additionally provided in the equipment body, or that two or more battery packs can be mounted in the equipment body, whereby even when the first battery pack is drawn from the equipment body, power is supplied from the internal battery or the second battery pack to thereby intend to hold the data.

However, if the internal battery or the second battery pack has been consumed to such an extent that sufficient power cannot be supplied, or the second battery is not mounted in the equipment body at the time the first battery pack is drawn, the power failure of the equipment body occurs. Thus, the above measures cannot fundamentally solve the problem.

SUMMARY OF THE INVENTION

It is therefore an object of the present invention to solve the problem that the battery pack is erroneously drawn from the equipment body during its operative condition to lose data to be held in the battery driven equipment.

According to the present invention, there is provided a battery driven equipment comprising an equipment body, a battery pack detachably mounted in the equipment body, a locking mechanism for releasably locking the battery pack with respect to the equipment body, means for determining whether or not the battery pack is allowed to be removed from the equipment body, and means for instructing the locking mechanism to lock or unlock the battery pack according to a result of determination by the determining means.

With this arrangement, the determining means determines whether or not the battery pack is allowed to be removed from the equipment body, and the instructing means instructs the locking mechanism to lock or unlock the battery pack according to the result of determination by the determining means. Accordingly, there is no possibility that the battery pack is erroneously drawn from the equipment body during its operative condition to lose data to be held in the battery driven equipment.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

A preferred embodiment of the present invention will now be described in detail with reference to the drawings.

Figure 1:
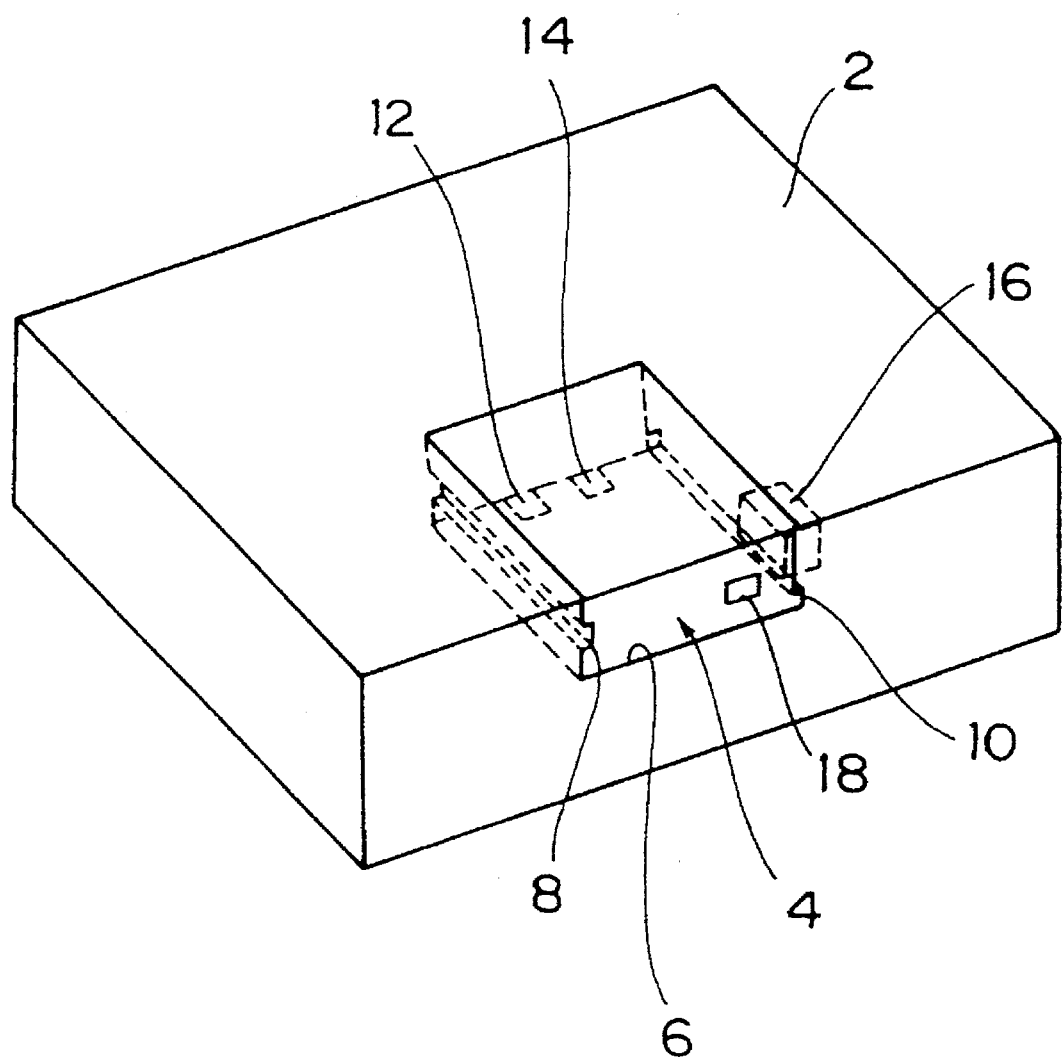
FIG. 1 is a perspective view of a battery driven equipment according to a preferred embodiment of the present invention.

FIG. 1 is a perspective view of a battery driven equipment showing a preferred embodiment of the present invention. Reference numeral 2 denotes an equipment body of the battery driven equipment such as a portable personal computer, and reference numeral 4 denotes a battery pack detachably mounted in the equipment body 2. The battery pack 4 is designed so that is can be slidably inserted into and drawn from a battery pack receiving portion 6 of the equipment body 2 in a given direction only. More specifically, a recess 8 and a projection 10 are formed on opposite side surfaces of the battery pack 4. On the other hand, a recess corresponding to the projection 10 and a projection corresponding to the recess 8 are formed on opposite side surfaces of the battery pack receiving portion 6 of the equipment body 2. Thus, the recess 8 and the projection 10 of the battery pack 4 are fitted with the projection and the recess of the battery pack receiving portion 6 of the equipment body 2, respectively, so that the battery pack 4 can be slid in the battery pack receiving portion 6 of the equipment body 2. The battery pack 4 is provided with electrodes 12 and 14 for supplying electric power to the equipment body 2. Reference numeral 16 denotes a plunger for locking the battery pack 4 to prevent the battery pack 4 from being erroneously drawn from the battery pack receiving portion 6 of the equipment body 2. Reference numeral 18 denotes a window through which a user can visually confirm whether or not the battery pack 4 is locked with respect to the equipment body 2 by a lever of the plunger 16 to be hereinafter described.

Figure 2A:
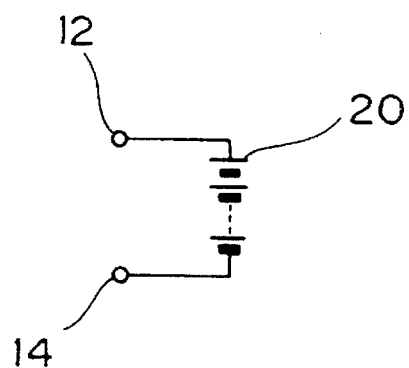
FIGS. 2A and 2B are a circuit diagram and a partially cutaway perspective view of a battery pack shown in FIG. 1, respectively.
Figure 2B:
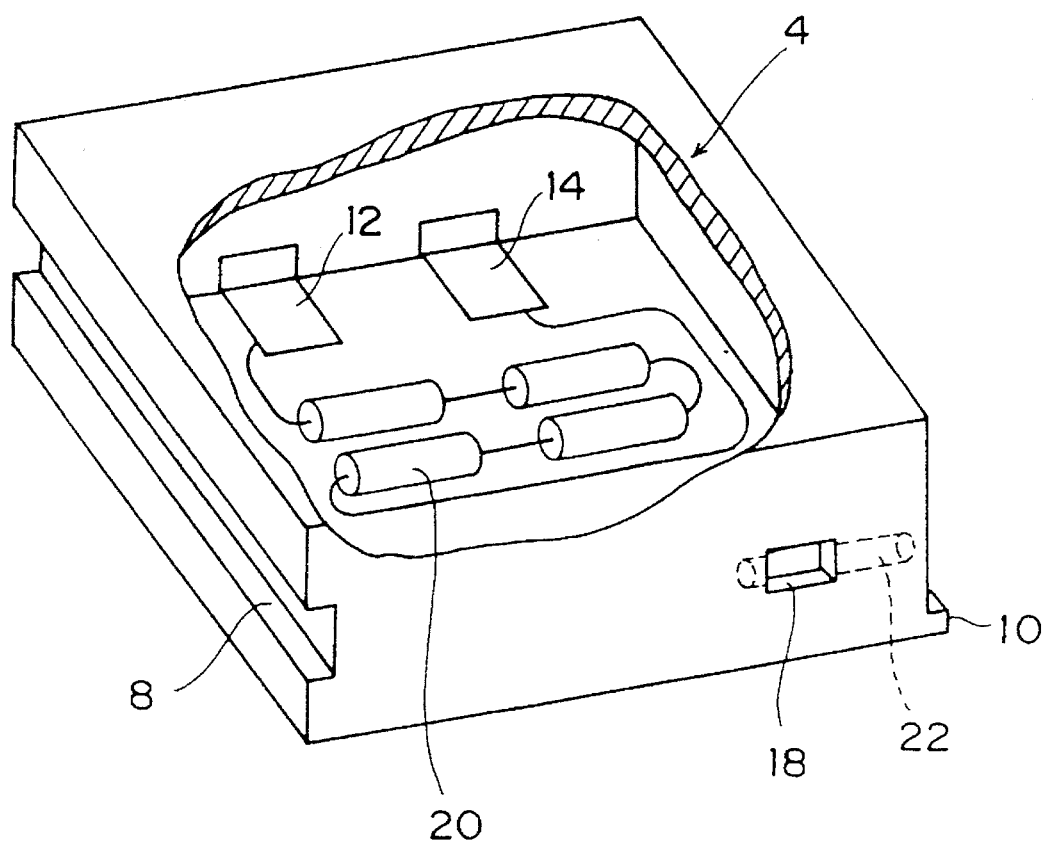

FIGS. 2A and 2B are a circuit diagram and a partially cutaway perspective view of the battery pack 4 shown in FIG. 1, respectively. Four batteries 20 are connected in series between the electrodes 12 and 14; however, the number of the batteries 20 is not limitative in the present invention. Reference numeral 22 denotes a lever engaging portion with which the lever of the plunger 16 engages in the locked condition of the battery pack 4. In this preferred embodiment, the lever engaging portion 22 is formed as an elongated hole formed in a side portion of the battery pack 4. The elongated hole 22 is partially exposed to the window 18 of the battery pack 4.

Figure 3:
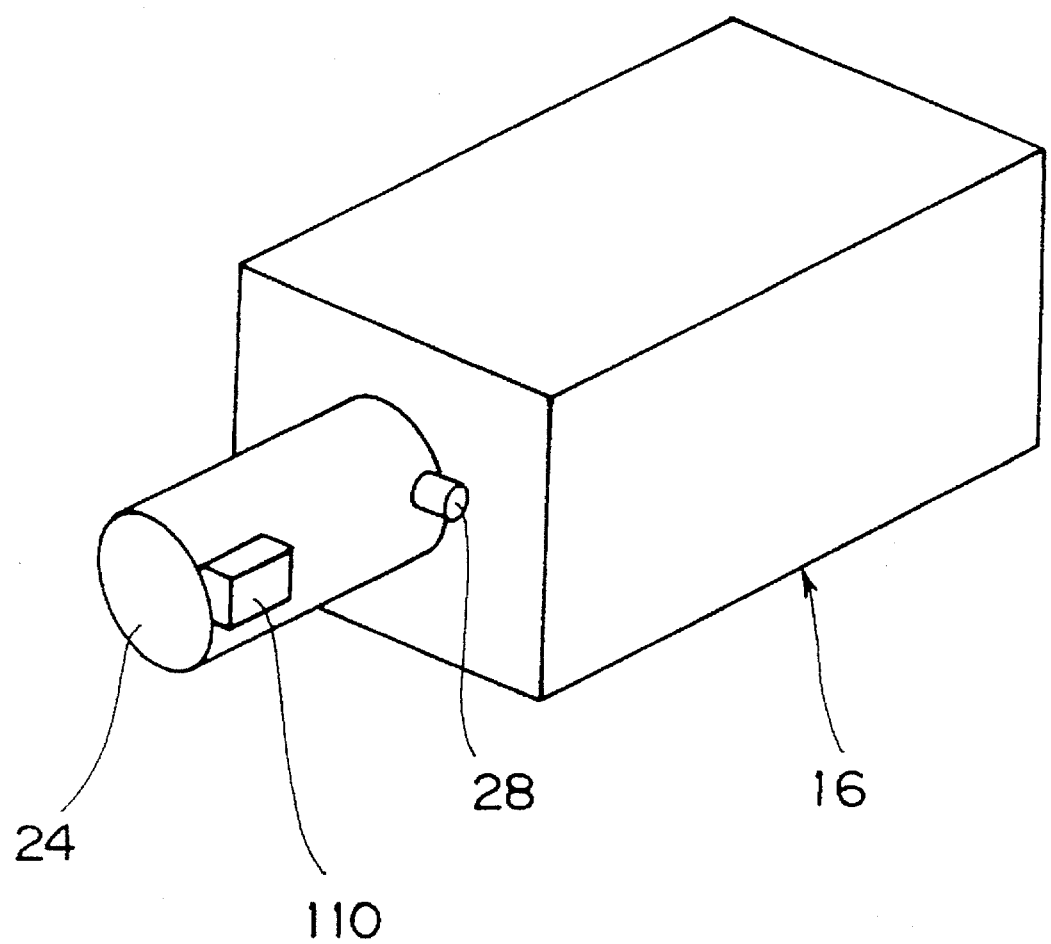
FIG. 3 is a perspective view of a plunger shown in FIG. 1.
Figure 4A:
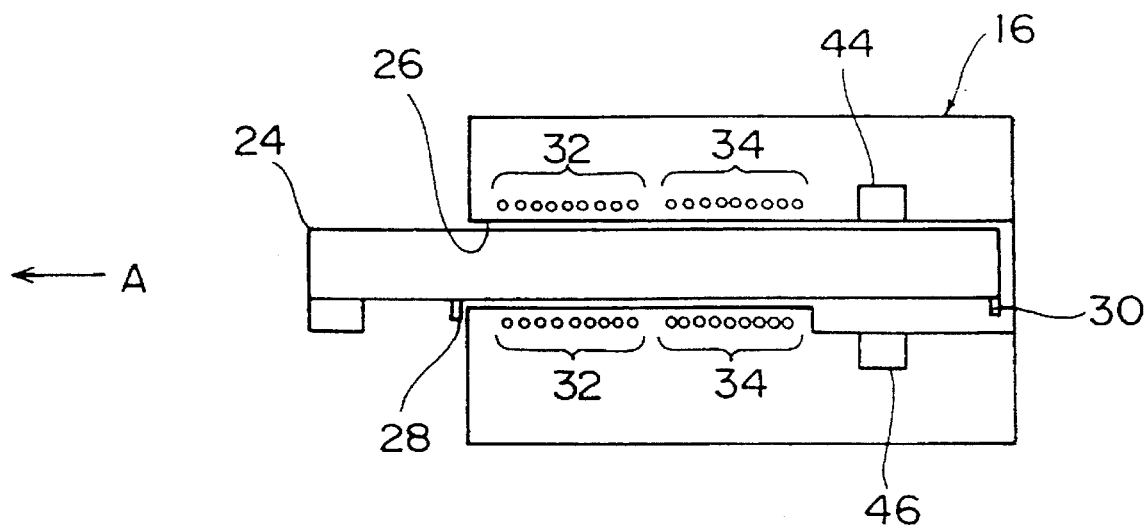
FIGS. 4A and 4B are plan views in horizontal section of the plunger, illustrating the operation of the plunger.
Figure 4B:
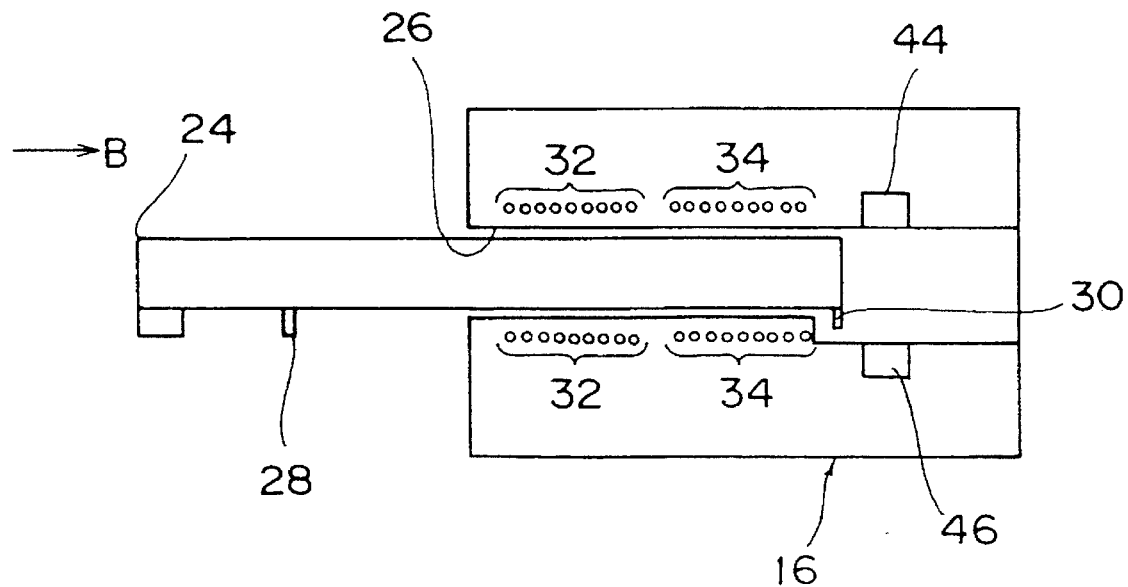
Figure 5:
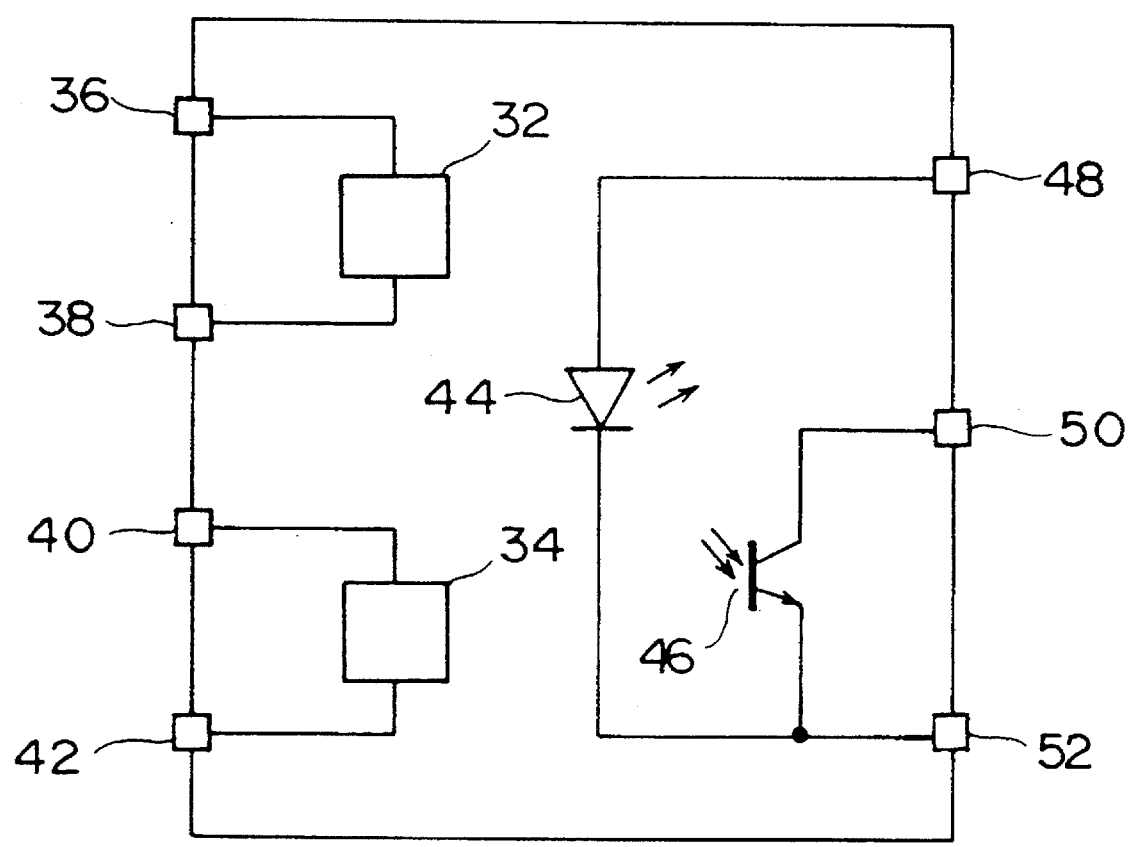
FIG. 5 is a circuit diagram of the plunger.

FIG. 3 is a perspective view of the plunger 16; FIGS. 4A and 4B are plan views in horizontal section of the plunger 16, illustrating the operation of the plunger 16; and FIG. 5 is a circuit diagram of the plunger 16. Reference numeral 24 denotes the lever of the plunger 16. The lever 24 is laterally movable in a guide 26 formed in the plunger 16. A pair of stoppers 28 and 30 are provided on the outer circumferential surface of the lever 24, so that the rightward movement of the lever 24 as viewed in FIGS. 4A and 4B is limited by the stopper 28, and the leftward movement of the lever 24 as viewed in FIGS. 4A and 4B is limited by the stopper 30.

The lever 24 is formed of a ferromagnetic material or a magnet in this preferred embodiment, and it is excited to be driven. More specifically, a pair of solenoids 32 and 34 are provided in the plunger 16 so as to be arranged in a longitudinal direction of the lever 24. Reference numerals 36 and 38 denote terminals for supplying current to the solenoid 32, and reference numerals 40 and 42 denote terminals for supplying current to the solenoid 34. The solenoid 32 is supplied with current flowing from the terminal 36 to the terminal 38, thereby moving the lever 24 in a direction shown by the arrow A in FIG. 4A, whereas the solenoid 34 is supplied with current flowing from the terminal 40 to the terminal 42, thereby moving the lever 24 in a direction shown by the arrow B in FIG. 4B.

When the lever 24 is moved in the direction A as shown in FIG. 4A, the lever 24 is inserted into the elongated hole 22 of the battery pack 4 (see FIG. 2B) set in the battery pack receiving portion 6 of the equipment body 2, thereby locking the battery pack 4 with respect to the equipment body 2. Conversely, when the lever 24 is moved in the direction B as shown in FIG. 4B, the lever 24 is drawn out of the elongated hole 22 of the battery pack 4, thereby unlocking the battery pack 4 with respect to the equipment body 2. Reference numeral 44 denotes a light emitting diode, and reference numeral 46 denotes a photosensor for detecting light emitted from the light emitting diode 44. As shown in FIG. 5, the light emitting diode 44 is connected between terminals 48 and 52, and the photosensor 46 is connected between terminals 50 and 52.

In the condition where the lever 24 is received in the plunger 16 as shown in FIG. 4A, the light from the light emitting diode 44 is cut off by the lever 24 to cause an increase in impedance between the terminals 50 and 52 of the photosensor 46. On the other hand, in the condition where the lever 24 is projected from the plunger 16 as shown in FIG. 4B, the light from the light emitting diode 44 is not cut off by the lever 24 to cause a decrease in impedance between the terminals 50 and 52 of the photosensor 46.

Figure 6:
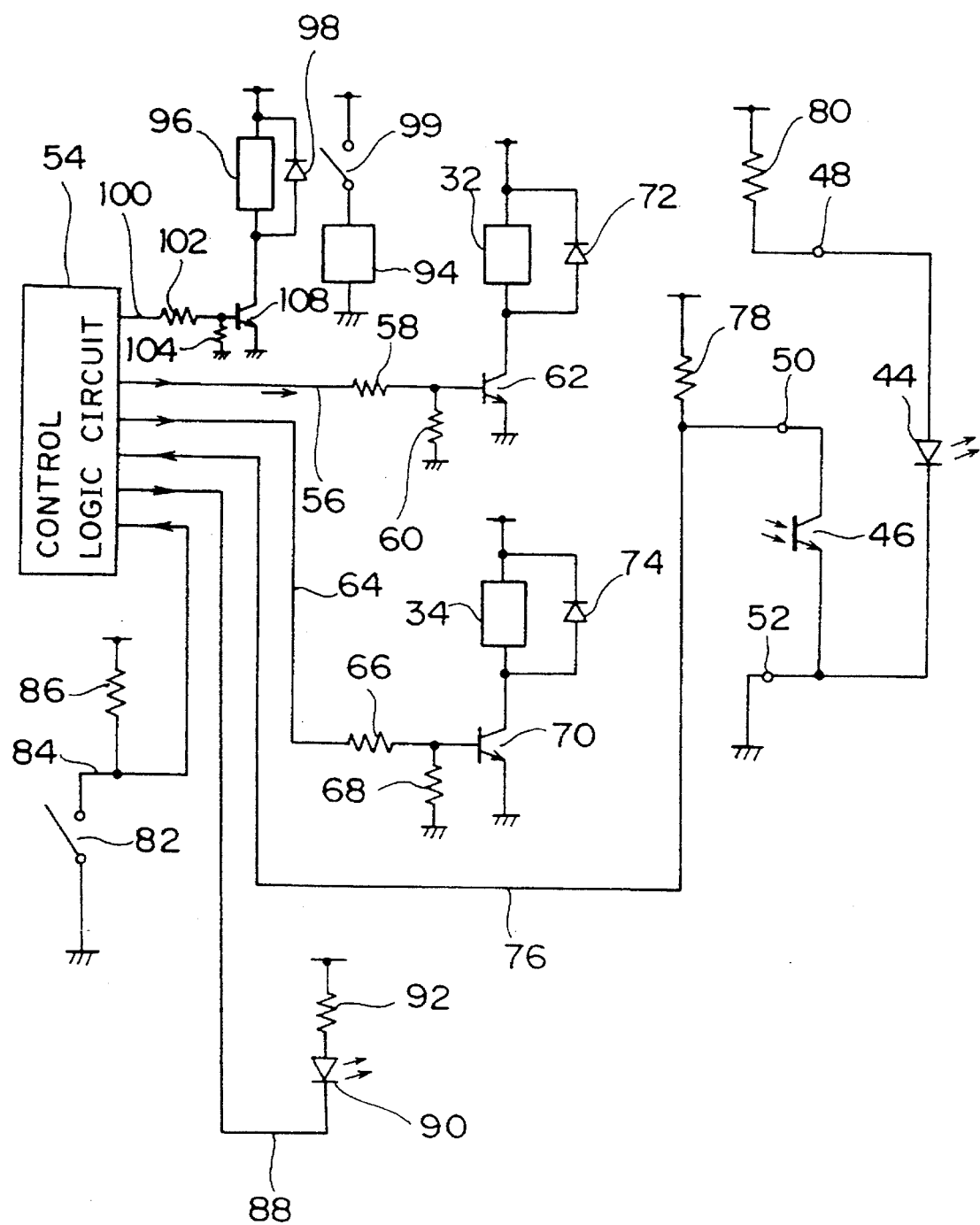
FIG. 6 is a circuit diagram of an essential part of an equipment body shown in FIG. 1.

FIG. 6 is a circuit diagram of an essential part of the equipment in this preferred embodiment. Reference numeral 54 denotes a control logic circuit provided in the equipment body 2, and reference numeral 56 denotes a signal line for controlling the solenoid 32 in the plunger 16 from the control logic circuit 54. The signal line 56 is connected through resistors 58 and 60 to a transistor 62. When the signal line 56 is of a high level, current is allowed to flow in the solenoid 32. Reference numeral 64 denotes a signal line for controlling the solenoid 34 in the plunger 16 from the control logic circuit 54. The signal line 64 is connected through resistors 66 and 68 to a transistor 70. When the signal line 64 is of a high level, current is allowed to flow in the solenoid 34. A diode 72 for absorbing a counter electromagnetic force is connected in parallel to the solenoid 32, and a diode 74 for absorbing a counter electromagnetic force is connected in parallel to the solenoid 34.

Reference numeral 76 denotes a signal line for inputting a condition of the terminal 50 of the photosensor 46 to the control logic circuit 54; reference numeral 78 denotes a pull-up resistor for deciding a voltage level of the signal line 76; and reference numeral 80 denotes a current limiting resistor for the light emitting diode 44 in the plunger 16. Reference numeral 82 denotes a power switch of the equipment body 2; reference numeral 84 denotes a signal line for inputting a condition of the power switch 82 to the control logic circuit 54; reference numeral 86 denotes a pull-up resistor for deciding a voltage level of the signal line 84. Reference numeral 88 denotes a signal line for controlling a light emitting diode 90 from the control logic circuit 54. When the signal line 88 is of a low level, the light emitting diode 90 is turned on. Reference numeral 92 denotes a current limiting resistor for the light emitting diode 90. Reference numeral 94 denotes an electronic circuit provided in the equipment body 2; reference numeral 96 denotes a relay coil; reference numeral 98 denotes a diode for absorbing a counter electromagnetic force of the relay coil 96; reference numeral 99 denotes a relay contact for supplying and cutting off power to the electronic circuit 94; reference numeral 100 denotes a signal line for controlling current flowing in the relay coil 96. The signal line 100 is connected through resistors 102 and 104 to a transistor 108. When the signal line 100 is of a high level, the relay contact 99 is closed to supply power to the electronic circuit 94.

There will now be described the operation of each part when the power switch 82 is turned on or off. When the control logic circuit 54 detects that the power switch 82 has been turned on, the circuit 54 makes the signal line 56 at a high level and keeps the high level for a given time period required to move the lever 24 of the plunger 16 in the direction A shown in FIG. 4A. As a result, the collector and the emitter of the transistor 62 are electrically connected together to allow current to flow in the solenoid 32. Accordingly, the lever 24 of the plunger 16 is moved in the direction A shown in FIG. 4A to lock the battery pack 4 with respect to the equipment body 2. Then, the control logic circuit 54 determines that the signal line 76 has become a low level, and makes the signal line 100 at a high level, thereby applying power to the electronic circuit 94.

On the other hand, when the control logic circuit 54 detects that the power switch 82 has been turned off, the circuit 54 makes the signal line 100 at a low level to cut off the power supplied to the electronic circuit 94. Then, the control logic circuit 54 makes the signal line 64 at a high level and keeps the high level for a given time period required to move the lever 24 of the plunger 16 in the direction B shown in FIG. 4B, thereby unlocking the battery pack 4 with respect to the equipment body 2.

Figure 7A:
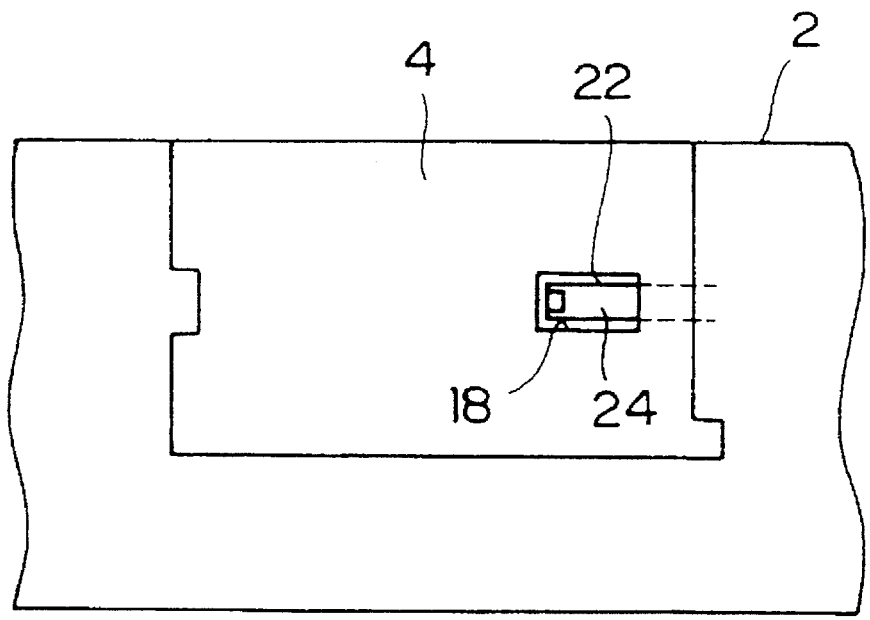
FIGS. 7A and 7B are fragmentary side views of the battery driven equipment, illustrating an example of a confirming method for a locked condition and an unlocked condition of the battery pack.
Figure 7B:
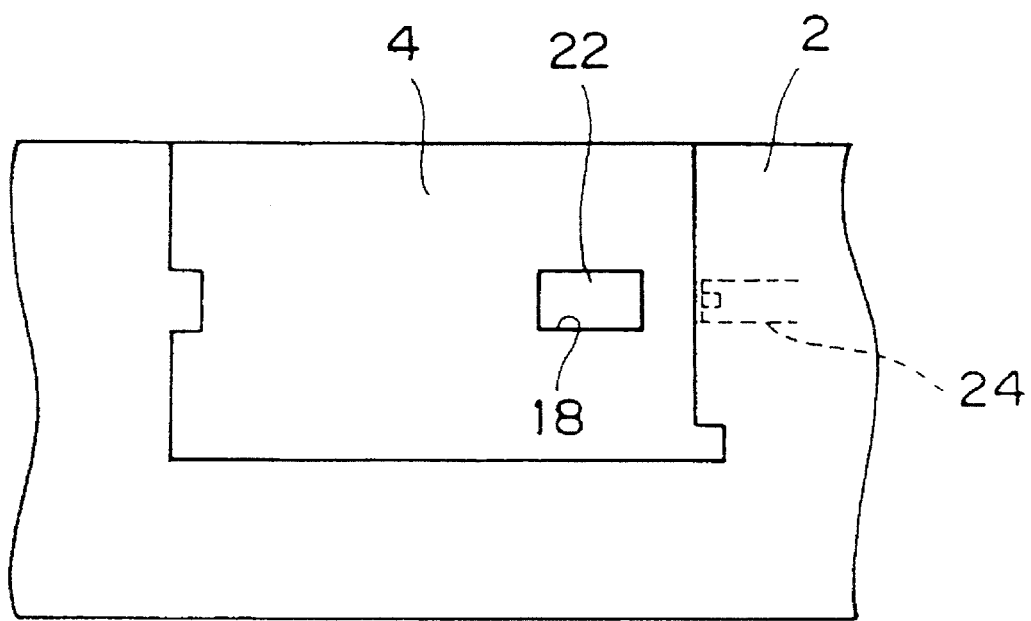

FIGS. 7A and 7B show an example of a confirming method such that the locked condition or the unlocked condition can be confirmed by the user. In the locked condition shown in FIG. 7A, a tip portion of the lever 24 of the plunger 16 can be visually confirmed through the window 18 of the battery pack 4. In the unlocked condition shown in FIG. 7B, the lever 24 cannot be visually confirmed through the window 18. Thus, the user can confirm whether the battery pack 4 is in the locked condition or in the unlocked condition. In this case, the color of the tip portion of the lever 24 may be set different from the background color of the lever engaging portion (elongated hole) 22, so that the user can easily confirm whether the battery pack 4 is in the locked condition or in the unlocked condition.

Figure 8A:
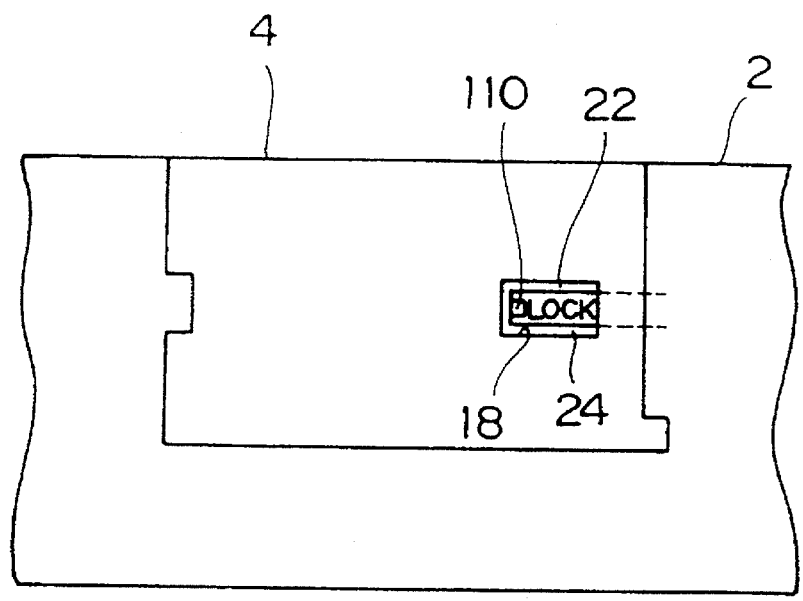
FIGS. 8A and 8B are views similar to FIGS. 7A and 7B, illustrating another example of the confirming method.
Figure 8B:
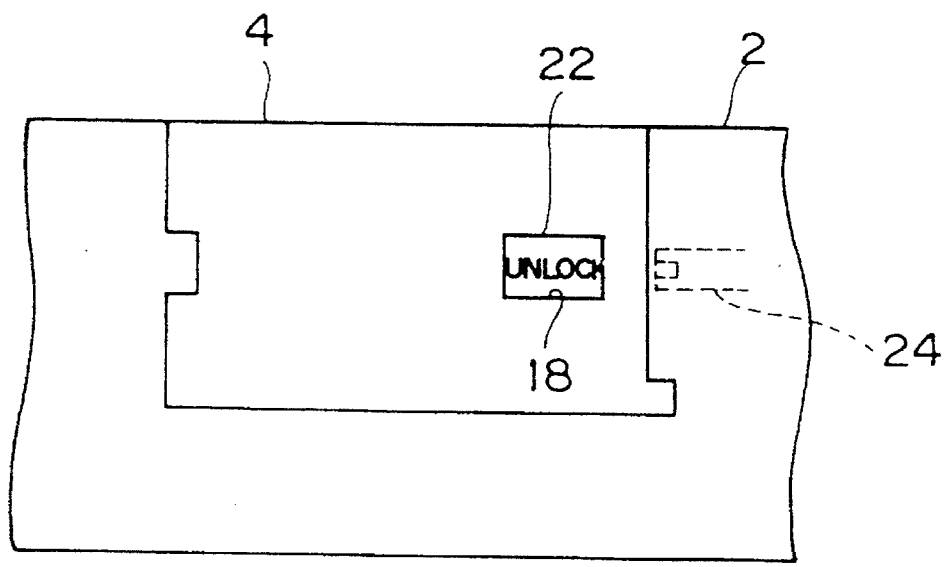

FIGS. 8A and 8B show another example of the confirming method for the unlocked condition or the unlocked condition by the user. In this example, the tip portion of the lever 24 to be exposed to the window 18 is provided with a label indicative of the locked condition, such as "LOCK" as shown in FIG. 8A. Furthermore, a portion of the lever engaging portion (elongated hole) 22 to be exposed to the window 18 is provided with a label indicative of the unlocked condition, such as "UNLOCK" as shown in FIG. 8B. Thus, the user can greatly easily confirm whether the battery pack 4 is in the locked condition or in the unlocked condition.

There is a possibility that a battery in the equipment body 2 is consumed in the locked condition of the battery pack 4 to cause a problem that the battery pack 4 cannot be removed from the equipment body 2. To cope with this problem, a projection 110 as a handling member is provided on the outer circumferential surface of the lever 24 at the tip thereof as shown in FIG. 3. The projection 110 is exposed to the window 18 in the locked condition of the battery pack 4. Accordingly, in the event that the battery pack 4 cannot be removed from the equipment body 2 in the condition where the lever 24 of the plunger 16 remains in the lever engaging portion 22, the lever 24 can be forcibly moved to unlock the battery pack 4 by handling the projection 110 from the outside of the window 18. It is preferable that the projection 110 has a structure such that it can be operated only by using a pointed tool such as a ball-point pen, so as to prevent wrong operation in a normal condition.

Figure 9:
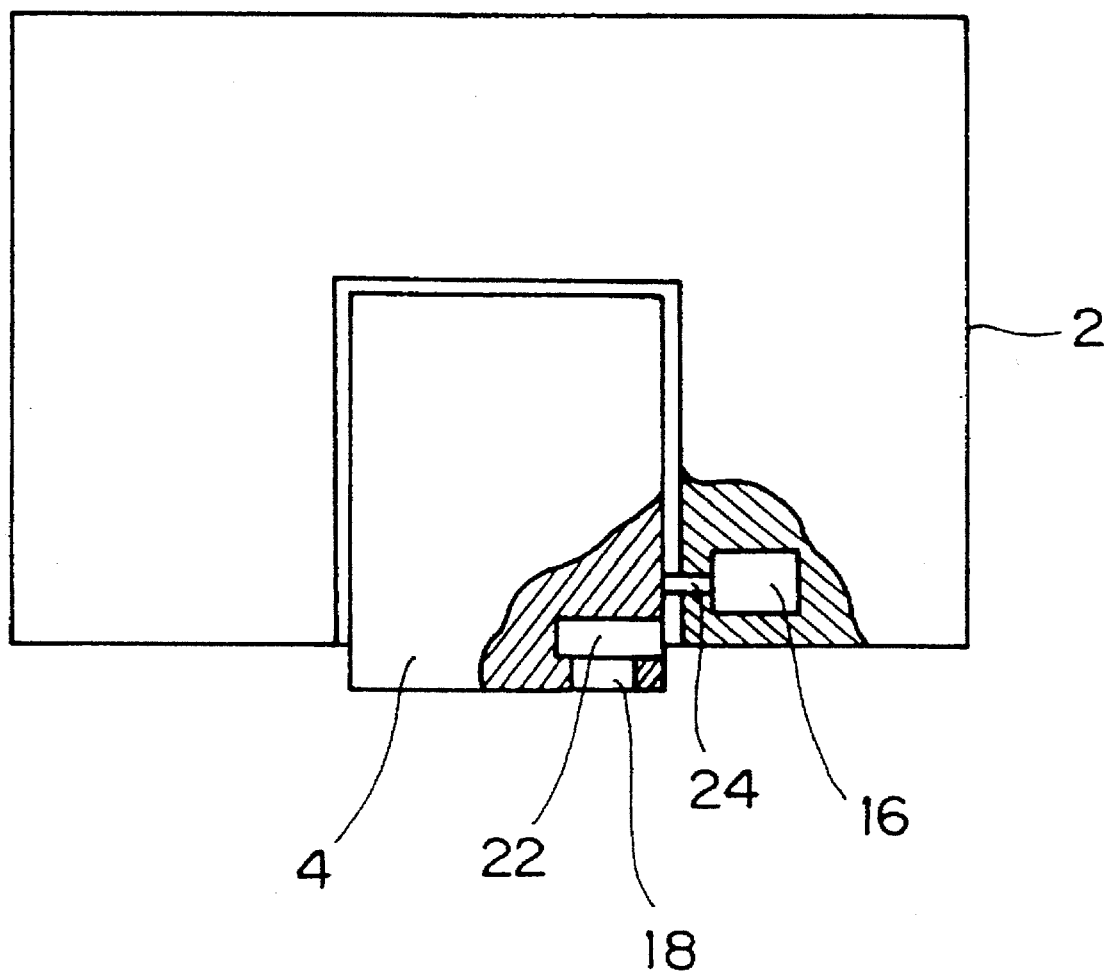
FIG. 9 is a partially cutaway plan view of the battery driven equipment in the condition where the battery pack is incompletely mounted in the equipment body.

FIG. 9 shows a condition where the battery pack 4 is incompletely mounted in the equipment body 2. In this condition where the battery pack 4 is incompletely mounted in the equipment body 2, there is a possibility that the electrodes 12 and 14 of the battery pack 4 may be barely in contact with the equipment body 2. As shown in FIG. 9, the lever engaging portion (elongated hole) 22 of the battery pack 4 is not aligned to the lever 24 of the plunger 16. Accordingly, even if current is allowed to flow in the solenoid 32, the lever 24 does not engage with the lever engaging portion 22, so that the terminal 50 of the photosensor 46 in the plunger 16 becomes a high level (see FIG. 6). Then, the control logic circuit 54 detects this condition to make the signal line 88 at a low level and turn on the light emitting diode 90, thereby informing the user that the battery pack 4 is incompletely mounted in the equipment body 2. In this case, it is preferable that no power is supplied to the electronic circuit 94.

According to the present invention unlike the conventional battery driven equipment having no locking mechanism, it is possible to prevent that the battery pack is erroneously drawn by the user from the equipment body during its operative condition to lose data to be held in the battery driven equipment.

Having thus described a specific embodiment of the present invention, it should be understood that the preferred embodiment is merely illustrative and not limitative. For example, the lever engaging portion 22 of the battery pack 4 is formed as an elongated hole in the above preferred embodiment, the lever engaging portion may have any other forms such as a groove. It is to be noted that the scope of the invention is set out in the appended claims, and all changes and modifications that fall within equivalence of the claims are intended to be embraced by the claims.

What is claimed is:

1. A battery driven equipment having a power switch, said battery driven equipment comprising an equipment body, a battery pack detachably mounted in said equipment body, a locking mechanism for releasably locking said battery pack with respect to said equipment body, first means for detecting whether the power switch is turned off, and second means for controlling said locking mechanism to lock or unlock said battery pack according to a result of detection by said first means.

2. A battery driven equipment according to claim 1, wherein said equipment body has a battery pack receiving portion for slidably receiving said battery pack; said locking mechanism comprises a plunger provided in said equipment body, said plunger having a lever movable in a direction so as to project into said battery pack receiving portion; and said battery pack has a lever engaging portion for engaging said lever; whereby when said lever is engaged with said lever engaging portion of said battery pack, said battery pack is locked with respect to said equipment body by said locking mechanism.

3. A battery driven equipment according to claim 2, wherein said lever engaging portion has an elongated hole formed in said battery pack for receiving a first end portion of said lever when said battery pack is completely received in said battery pack receiving portion.

4. A battery driven equipment according to claim 3, further has means for detecting that said battery pack is incompletely received in said battery pack receiving portion and informing a user of a result of detection.

5. A battery driven equipment according to claim 4, wherein said third means detecting means for detecting that said first end portion of said lever is not received in said elongated hole, and a first light emitting diode adapted to be turned on to indicate a result of detection by said detecting means.

6. A battery driven equipment according to claim 4, wherein said battery pack further has a window exposed to view of said user and communicating with said elongated hole, whereby a locked condition and an unlocked condition of said battery pack by said locking mechanism can be visually confirmed through said window by said user.

7. A battery driven equipment according to claim 6, wherein a color of said first end portion of said lever to be exposed to said window is different from a background color in said elongated hole.

8. A battery driven equipment according to claim 6, wherein said first end portion of said lever to be exposed to said window is provided with a label indicative of said locked condition, and a portion of said elongated hole to be exposed to said window is provided with a label indicative of said unlocked condition.

9. A battery driven equipment according to claim 2, wherein said lever is formed of a ferromagnetic material, and said plunger further comprises means for exciting said lever, said exciting means being supplied with current to move said lever.

10. A battery driven equipment according to claim 9, wherein said exciting means comprises first and second solenoids as coils wound around said lever, one of said first and second solenoids being selectively supplied with the current to decide a moving direction of said lever.

11. A battery driven equipment according to claim 1, wherein said second means controls said locking mechanism to unlock said battery pack when said first means detects that said power switch is off, whereas said second means controls said locking mechanism to lock said battery pack when said first means detects that said power switch is on.

12. A battery driven equipment according to claim 5, wherein said detecting means comprises a second light emitting diode and a photosensor opposed to each other with a second end portion of said lever interposed therebetween.

13. A battery driven equipment according to claim 1, further comprising means for forcibly releasing a locked condition of said battery pack by said locking mechanism.

* * * * *